(12) United States Patent
Binder et al.

(10) Patent No.: US 7,339,891 B2
(45) Date of Patent: Mar. 4, 2008

(54) METHOD AND SYSTEM FOR EVALUATING WIRELESS APPLICATIONS

(75) Inventors: Robert Binder, Glencoe, IL (US); James Hanlon, Chicago, IL (US)

(73) Assignee: mVerify Corporation, Chicago, IL (US)

( * ) Notice: Subject to any disclaimer, the term of this patent is extended or adjusted under 35 U.S.C. 154(b) by 589 days.

(21) Appl. No.: 10/340,348

(22) Filed: Jan. 9, 2003

(65) Prior Publication Data

US 2003/0156549 A1    Aug. 21, 2003

Related U.S. Application Data

(60) Provisional application No. 60/346,931, filed on Jan. 9, 2002.

(51) Int. Cl.
*H04L 12/26* (2006.01)

(52) U.S. Cl. ............... 370/231; 370/235; 370/241; 370/252; 380/270; 702/108

(58) Field of Classification Search ............... 703/21; 370/252, 270, 231, 235; 709/203, 224; 714/4, 714/18; 380/270; 702/108
See application file for complete search history.

(56) References Cited

U.S. PATENT DOCUMENTS

| | | | |
|---|---|---|---|
| 5,394,540 A * | 2/1995 | Barrington et al. ............ | 703/21 |
| 5,572,570 A * | 11/1996 | Kuenzig ..................... | 379/1.02 |
| 5,675,581 A * | 10/1997 | Soliman ...................... | 370/252 |
| 6,169,896 B1 * | 1/2001 | Sant et al. ................... | 455/424 |
| 6,269,330 B1 * | 7/2001 | Cidon et al. .................. | 714/43 |
| 6,272,337 B1 * | 8/2001 | Mount et al. ................ | 455/423 |
| 6,324,647 B1 * | 11/2001 | Bowman-Amuah .......... | 726/23 |
| 6,330,428 B1 * | 12/2001 | Lewis et al. .............. | 455/67.11 |
| 6,519,228 B1 * | 2/2003 | Creamer et al. ......... | 379/15.01 |
| 6,519,452 B1 * | 2/2003 | Agostino et al. ........... | 455/423 |
| 6,571,082 B1 * | 5/2003 | Rahman et al. .......... | 455/67.11 |
| 6,606,590 B1 * | 8/2003 | Swoboda et al. ............. | 703/28 |
| 6,678,355 B2 * | 1/2004 | Eringis et al. ................ | 379/22 |
| 6,728,259 B1 * | 4/2004 | Gronberg .................... | 370/465 |
| 6,728,612 B1 * | 4/2004 | Carver et al. ................. | 701/33 |
| 6,765,955 B1 * | 7/2004 | Davis et al. ................. | 375/222 |
| 6,879,812 B2 * | 4/2005 | Agrawal et al. ......... | 455/67.11 |
| 6,958,977 B1 * | 10/2005 | Mitrani et al. .............. | 370/252 |
| 6,963,814 B2 * | 11/2005 | Jones et al. ................. | 702/119 |
| 6,973,622 B1 * | 12/2005 | Rappaport et al. .......... | 715/735 |
| 6,990,616 B1 * | 1/2006 | Botton-Dascal et al. .... | 714/715 |
| 7,003,264 B2 * | 2/2006 | Fodor et al. ............. | 455/67.11 |
| 7,072,961 B1 * | 7/2006 | Maclean et al. ............ | 709/224 |
| 7,085,592 B1 * | 8/2006 | Davies .................... | 455/562.1 |

(Continued)

OTHER PUBLICATIONS

J. Short, R. Bagrodia, L. Kleinrock, "Mobile Wireless Network System Simulation," 1995 ACM, pp. 195-209.*

(Continued)

*Primary Examiner*—Hugh Jones
*Assistant Examiner*—Kibrom Gebresilassie
(74) *Attorney, Agent, or Firm*—McDonnell Boehnen Hulbert & Berghoff LLP

(57) ABSTRACT

The present invention provides a method and system for evaluating wireless applications utilizing a test console, an application model builder, a test repository manager, a simulator, a test controller, test agents, and a comparator in order to test the performance of a plurality of mobile user devices on a wireless network.

9 Claims, 3 Drawing Sheets

U.S. PATENT DOCUMENTS

| | | | |
|---|---|---|---|
| 7,151,938 B2* | 12/2006 | Weigand | 455/452.1 |
| 7,197,013 B2* | 3/2007 | Douglas et al. | 370/252 |
| 7,251,252 B2* | 7/2007 | Norby | 370/466 |
| 2002/0006159 A1* | 1/2002 | Wagner et al. | 375/224 |
| 2003/0033406 A1* | 2/2003 | John et al. | 709/224 |
| 2003/0045298 A1* | 3/2003 | Linton et al. | 455/452 |
| 2004/0002843 A1* | 1/2004 | Robarts et al. | 703/13 |
| 2004/0038687 A1* | 2/2004 | Nelson | 455/456.1 |
| 2005/0075992 A1* | 4/2005 | Gavan et al. | 706/10 |
| 2006/0010448 A1* | 1/2006 | Sathe | 718/102 |
| 2006/0019679 A1* | 1/2006 | Rappaport et al. | 455/456.5 |

OTHER PUBLICATIONS

J. Short, R. Bagrodia, and L. Kleinrock, "Mobile Wireless Network System Simulation", 1995.*

* cited by examiner

METHOD AND SYSTEM FOR EVALUATING WIRELESS APPLICATIONS

PRIORITY

This application claims priority under 35 U.S.C. 119(e) to provisional application Ser. No. 60/346,931, filed on Jan. 9, 2002 and entitled "Method and System for Evaluating Wireless Applications."

FIELD OF THE INVENTION

The present invention relates to evaluating wireless applications, and in particular, it provides a new and unique system for simulating the environmental conditions of a wireless application in order to assess its performance and/or reliability.

BACKGROUND

The dramatic increase in the use of wireless network technologies requires new approaches both to network design, and to the applications which depend on them. The functionality, performance, and scope of mobile applications are no less complex than tethered, wired network applications. In addition, they require many more input combinations to adequately test the interaction of mobility-related application features with mobile device features essential to wireless applications. When a user of a cell phone or personal digital assistant (PDA) taps a few keys to get current stock quotes or a weather report, a very large and complex collection of application software, operating system software, network equipment, databases, telecommunications equipment, and radio transmission equipment must cooperate to service that request. End-to-end testing means exercising the complete round trip from the end-user interface through a wireless and wired network to the application server systems and back to the end-user. The response time and results the end-user sees are affected not only by all these piece parts, but also by how many other end-users are active and what they are doing, as well as that end-user's location and rate of movement. Signal strength varies both with speed of movement and geographic position, airlinks can be dropped or handed-off to equipment with different protocols, and, for location-based services, the end-user's actual, real-time, physical location is a critical input.

Designing wireless packet-based mobile networks requires the designer to simultaneously consider several aspects of network structure and behavior. The designer must consider burst characteristics of packet traffic, bandwidth dimensioning for real time applications like voice, data, steaming video, and Internet applications. Present-day routing algorithms use not only the shortest path but also the less congested, priority, resource reservation mechanisms, and so on. Thus, delivering reliable mobile applications is not simply a matter of providing sufficient network bandwidth. Link topologies, traffic characterization, RF propagation/dimensioning models, economic and tariff models must also be considered. Before deployment of applications dependent on such sophisticated network technologies, the networks and their features must be accurately and efficiently tested to determine, among other things, network performance and/or reliability in the context of application-specific loads.

Moreover, as software and hardware designs for wireless communication devices have become increasingly complicated, it is often difficult, risky, costly and/or inefficient to verify the performance, scalability, and reliability of a wireless packet-based mobile network carrying data services for a multitude of devices. Typically, a communication device includes thousands of hardware components and millions of lines of software. Such complexity makes it difficult to predict how these components will influence one another during operation. For example, the type of protocol the device will use to communicate with over a network may have significant impact on the hardware and/or software design. Furthermore, the interaction of several communication devices over a wireless network may result in field performance far different from that seen in or estimated for a pairwise point-to-point scenario

EXHIBIT 1

Scope of Testing Needed to Reveal Typical Mobile Application Failure Modes

| Mobile Application Failure Mode by Component | MUD 21 | Base Station | MSC/ PSTN | TCP/IP Network | App Servers |
|---|---|---|---|---|---|
| MUD Application Client Under Test 16 | | | | | |
| Functionality | X | | | | |
| Response Time | X | | | | |
| MUD 21 Resource Utilization | X | | | | |
| Airlink Interface | | | | | |
| QOS Edge Combinations | X | X | | | |
| In-cluster Hand Offs | X | X | | | X |
| Multiple Base St Protocol | X | X | | | X |
| Roaming | X | X | | | X |
| Location Services | | | | | |
| On device GPS | X | X | | | |
| Triangulation | X | X | | | |
| Server Interaction | | | | | |
| Incorrect out | X | | | | X |
| Abend | X | | | | X |
| Server Exception | X | | | | X |
| Configuration | X | X | X | X | X |

EXHIBIT 1-continued

Scope of Testing Needed to Reveal Typical Mobile Application Failure Modes

| Mobile Application Failure Mode by Component | MUD 21 | Base Station | MSC/ PSTN | TCP/IP Network | App Servers |
|---|---|---|---|---|---|
| Base Station | | | | | |
| Operations/Administration/Mainten | X | X | X | | |
| Background load ("breathing") | X | X | X | | |
| Packet Load/Edge Combinations | X | X | X | | |
| Weather, solar, etc. | X | X | X | | |
| Application Server 6 | | | | | |
| Functionality | | | | | X |
| Response Time | | | | | X |
| Server Resource Utilization | | | | | X |
| Billing/Provisioning/Security | | | | | X |
| Background processor contention | | | | | X |
| Dispatch/Allocation | | | | X | X |
| Background IP Load | | | | X | X |
| Client transaction saturation | X | X | X | X | X |
| End to end | | | | | |
| Response time | X | X | X | X | X |
| Capacity | X | X | X | X | X |
| Reliability | X | X | X | X | X |
| Availability | X | X | X | X | X |
| Geographic Coverage | X | X | X | X | X |

Exhibit 1 shows the relationship between the kinds of failures that can occur in a mobile application network and the scope of testing necessary to produce those failures (development testing seeks to cause failures so that they may be corrected before general release.) The Xs show which components must be tested together to reveal a failure mode. For example, suppose a bug in a Mobile User Device (MUD) application software 16 is sensitive to airlink QOS (Quality of Service) levels only seen when the MUD 21 is moving at 60 miles per hour and the cell cluster range is contracting ("breathing") due to an increasing load. The test environment must control at least the MUD 21 and the Base Station to evaluate the application's response to this situation and to reveal what failure-causing defects, if any, are present.

Although the operational field installation of a complex network system would seem to be an ideal test bed for the applications it supports, using an operational network for testing is almost never practical or prudent. This would be like using a metropolitan expressway for automotive crash testing at rush hour. Even if an expressway could be cleared, it would be an ineffective test environment because of obstacles to controllability and repeatability. For example, the ideal test environment for an automotive telematics system is a million cars and drivers with active transceivers using actual satellite links, accessing actual database servers, and transmitting results back to each vehicle (i.e., the actual field system.) Supporting this idealized development testing would further require each of the million drivers to drive a preplanned route, entering preplanned tests at predetermined moments, over days, weeks, and months. However, such an approach is never practical. Controlling the test setup, varying test parameters, or rerunning tests on a new or modified system would be cumbersome and prohibitively costly, if it could be accomplished at all. Current best practice is to test components in isolation, followed by limited inter-component testing in a scaled-down lab. Some automated load testing using low-fidelity software emulation may be done. Finally, the testers conduct a few end-to-end functional tests, often manually, and often in only a few field locations. Even this limited testing is very costly and often does not achieve the desired reliability.

BRIEF SUMMARY OF THE INVENTION

The present methods allow for end-to-end testing of a wireless application in an environment analogous to the real-world environment in which the wireless application would be implemented. This realistic virtual environment is created through the simulation of both multiple end-users and various usage behaviors across those virtual end-users. The simulated end-users and end-user behaviors are translated into streams of input that could be applied to the wireless application to be tested. Using a trusted source, expected test results are generated from the input streams. Actual test results are generated by applying the input streams to the system implementing the wireless application—the system usually consisting of an actual or a virtual mobile device, and these actual results are compared to the expected results to determine if the wireless application functions as planned. By comprehensively simulating the environment surrounding the wireless application, the present methods provide more robust wireless application testing than previous methods.

DETAILED DESCRIPTION OF EXEMPLARY EMBODIMENTS

Figure 1:
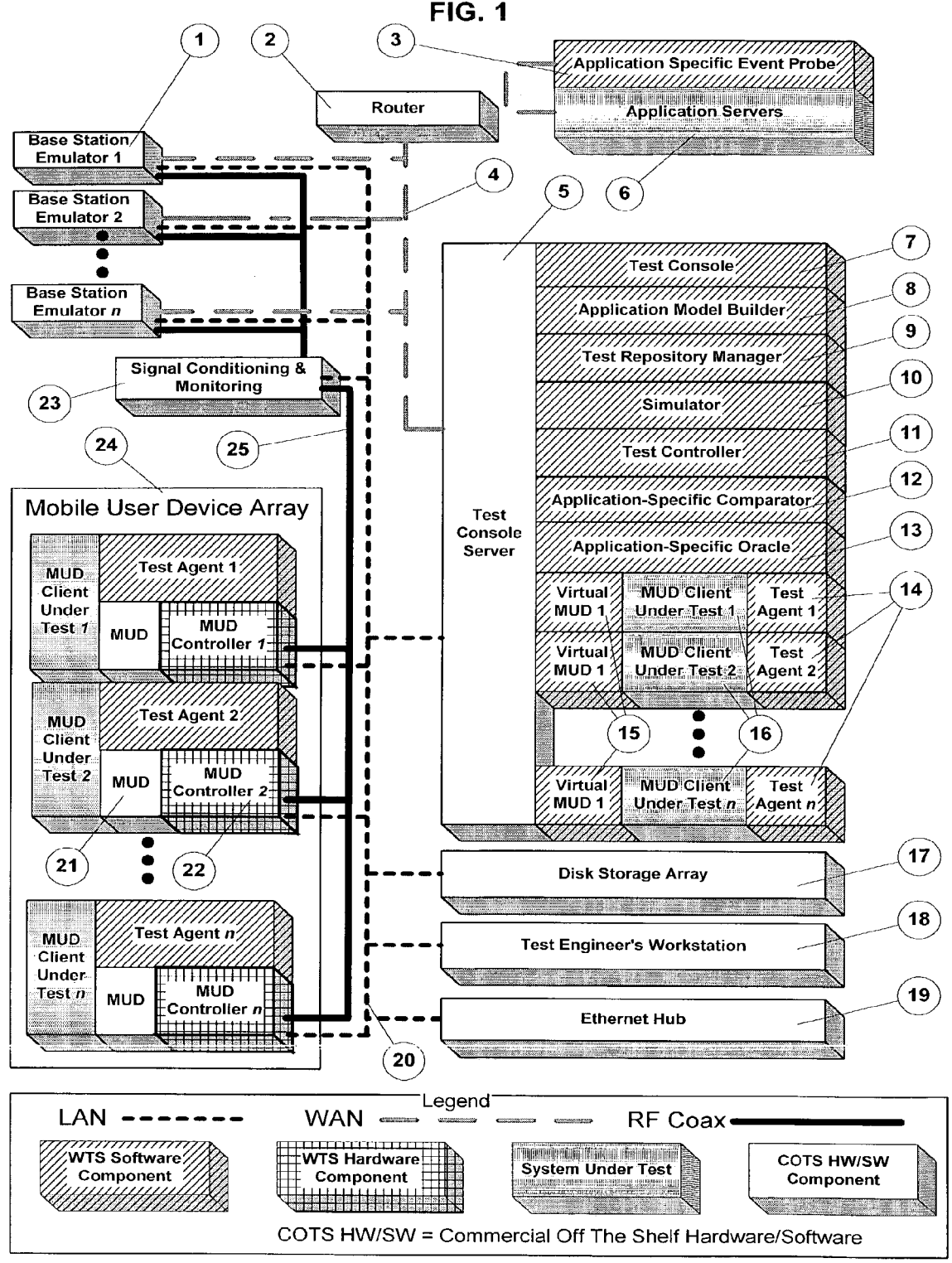
FIG. 1 shows an exemplary wireless testing system architecture.

The present embodiments provide for an end-to-end, high fidelity, automated testing system for wireless networks and wireless communication devices. The present embodiments, which are exemplified in a wireless testing system (WTS) disclosed herein, enable application developers and providers to verify total system performance and functionality before releasing such products. WTS will simulate, emulate, and control a wide range of mobile user devices and associated network equipment over multisource, multiprotocol, cellular voice and wireless data networks to evaluate mobile application reliability and performance. In one embodiment, WTS may be used to predict scalability and/or performance limitations for a wireless packet-based mobile network carrying voice and/or data services. In another embodiment, WTS may be used to evaluate the performance and function of candidate access points and clients in 802.11 (WiFi) networks. Thus, for example, WTS may be used by those in the wireless communications industry as a tool for wireless network development and wireless communication device development. It should be understood, however, that the teachings described herein are not limited to any particular wireless network or wireless communication device.

I. Overview of an Exemplary Wireless Testing System (WTS)

WTS simulates the behavior of end-users operating wireless phones, personal digital assistants, pagers, and so forth. The exemplary WTS architecture includes both hardware and software components, but alternately, may include only software or only hardware components. The components are described in more detail below, but include a Test Console 7, Application Model Builder 8, Test Repository Manager 9, Simulator 10, Test Controller 11, Test Agent 14, Event Probe Framework 36, Comparator Framework 38, and Oracle Framework 37. These components interact to provide a virtual environment including a number of simulated end-users from which a product and/or network may be automatically and realistically tested.

The virtual environment is formed by representing end-users of the system under test and may also represent the end-users' movement through, and network interaction within, a large geographical area. The representation of one end-user within WTS is referred to as a virtual user. A set number of virtual users provides a virtual population that can be simulated in a test run. In addition to technical network-associated characteristics, the behavior of end-users may also be modeled to generate a realistic load on the network. For example, one class of end-users makes infrequent access and only uses short message service. Another class of end-users may have heavy AM and PM use for about 45 minutes and tends to choose the same application services. Virtual users and end-user behavior models are part of the overall application model developed by a test engineer and stored in the WTS Repository Manager 9. Representation of the end-users' movement and network interaction through a large geographical area may be provided by entering coverage maps into the WTS Repository Manager 9 that map signal strength, delay time, allowable users, and other location-specific variables onto a specific physical space. For example, WTS may use a RF cable 25 to communicate directly with a base station or Base Station Emulator 1 to avoid saturation of airwaves, but WTS can still simulate fading, dynamic load-based cell reconfiguration ("breathing"), movement over any number of cells, and so on, using the coverage maps. Thus, virtual users may "roam" through various cells to provide a realistic testing environment with respect to spatial effects.

To provide a realistic environment with respect to temporal effects, the load and event profile of the simulation controls variation in the number of active virtual users and the rate at which each active virtual user interacts with the system under test during a test run. This number may vary over time, in accordance with an Application Profile 27. For example, while there are typically many thousands of potential users in the vicinity of a base station, only hundreds will be actively using an application, and only tens may have an available transmission channel allocated to their devices. The range of related intervals is similar: such as weeks to months as a member of a user population, minutes to hours actively using an application, micro- to milliseconds actually using a channel.

The present embodiments can support a wide range of testing scenarios. Consequently, given the combined hardware and software complexity of current wireless applications, high operational reliability may still be achieved with high volume, profile-based testing provided by WTS.

II. Exemplary WTS Software Architecture

Figure 2:
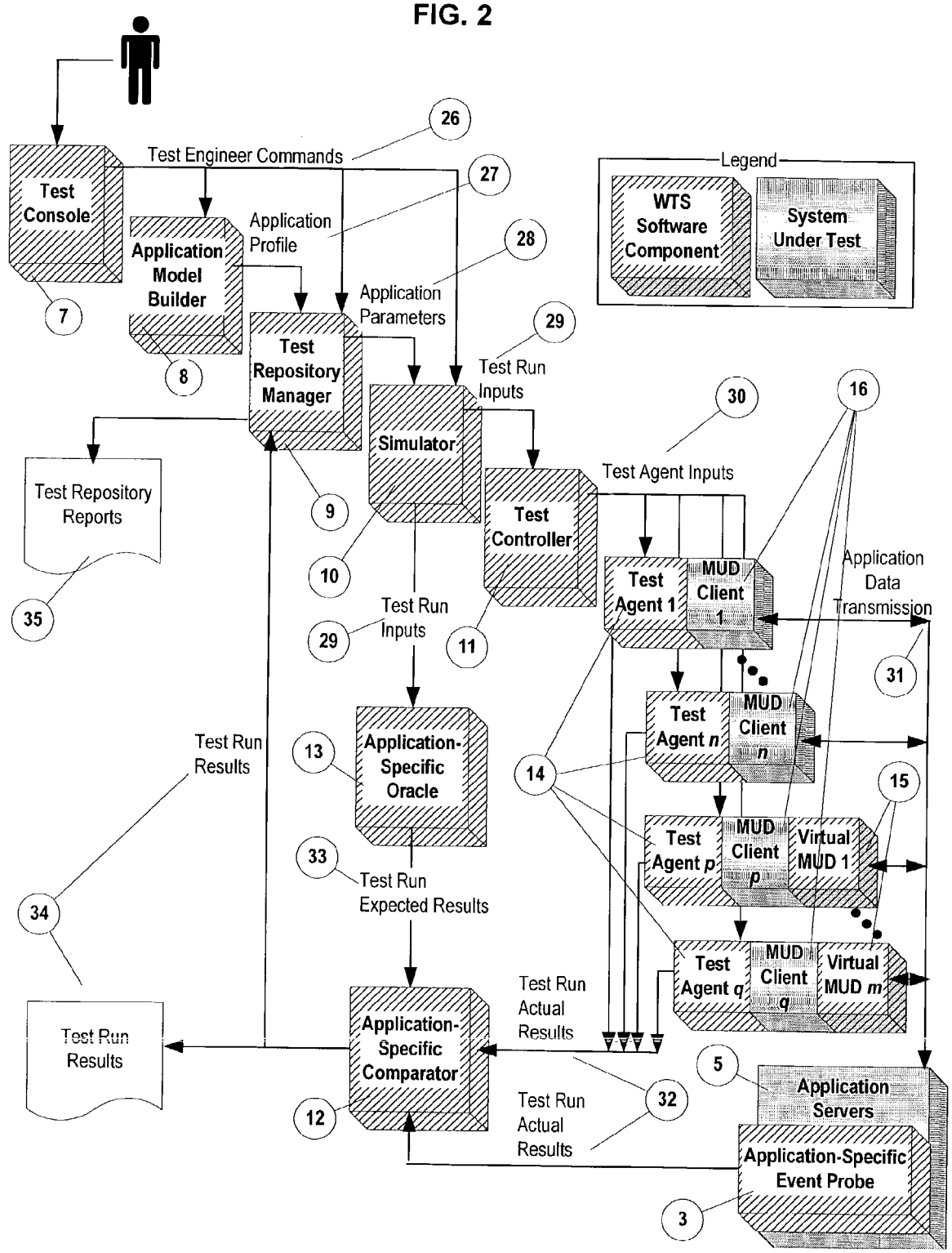
FIG. 2 shows an exemplary software architecture for the wireless testing system.

WTS software components including the Test Console 7, Application Model Builder 8, Test Repository Manager 9, Simulator 10, Test Controller 11, Test Agents 14, Virtual Mobile User Device 15, Event Probe Framework 36, Comparator Framework 38, and Oracle Framework 37. WTS may be controlled through a directly connected computer that hosts WTS or any of its components, or alternatively, over a network such as a local area network or wide area network like the Internet. FIG. 2 shows, in general, the WTS software components and interfaces.

Test Agent(s) 7 run on the MUD Controller 22 processor and on the Test Console Server 5. All other components preferably run on the Test Console Server 5 processor. The Test Engineer uses the Application Model Builder 8 and the Test Repository Manager 9 to create an executable model of a system under test and its environment, and to perform analysis of models and test runs. The Simulator 10 may run offline (i.e., it runs to completion before a test run is started), and ultimately generates a Test Run Input file 29. This file is processed by the Test Controller 11, which then sends Test Agent Inputs 30 to many concurrently executing Test Agents 14. The Test Agents 14 control the MUD Client 16 application software, which may run on either an actual MUD 21 or Virtual MUD 15. The Application-Specific Oracle 13 generates Test Run Expected Results 33, which are compared to Test Run Actual Results 32 by the Application-Specific Comparator 12, which evaluates the test run.

The Test Console 7 is the graphic user interface to WTS all system functions. The Test Console 7 communicates with all other WTS components. A few exemplary commands that may be input through the Test Console 7 include the following:

---

System configuration and administration (various).
User logon/logoff.
Select/execute a test setup procedure.
Select/execute a test suite to run.
Generate a new setup.
Monitor and control the execution of a test run.
Configure and display run time visualization.

---

The Application Model Builder 8 is used to develop an integrated model of application user behavior, required application behavior, application user profiles, application user input domains, application interfaces, and load profiles, and so on. The models may be input through a graphical user interface (GUI). In this embodiment, the Application Model Builder 8 may provide the following modeling capabilities:

---

Modeling application-specific event profile. An event profile is a set of probabilities for a set of events. This specifies the average relative frequency of a set of events. For example, the profile query = 0.80, update = 0.18, retry = 0.02 results in about 80% queries, 18% updates, and 2% retries.
Modeling of application-specific user events. An event model defines the inputs and outputs of each event, and specifies which particular outputs are to be produced when particular input conditions occur
Modeling of time-varying load profile. The load profile is a mathematical function that increases or decreases the average event rate during a simulation.. For example, the input rate increases a constant rate as a function of time.
Modeling of hierarchic state machines to represent repetitive user behavior. A state machine defines the sequence in which events may be generated. For example, a query may be repeated any number of times and may follow any other event, an update must follow a query, and a retry must follow an update. When there are many such sequences, it is usually advisable to organize them into a hierarchy
Modeling of the specific communication/control interfaces for all system interfaces (e.g., hand held devices.)
Modeling of user movement through a cell (i.e. radio coverage area)
Modeling of cell signal properties
Allocation of abstract events to generic interface types
Definition of domains for all system inputs and outputs. A domain is the set of all acceptable values for an input or an output. For example, the domain of the withdrawal amount accepted at an Automatic Teller Machine is a number between 20.00 and 400.00, which must be evenly divisible by 20.
Modeling Extended Use Cases. A use case is a narrative description of an interaction with a system that accomplishes a task relevant to a user. An Extended Use Case is a modeling formalism which adds to narrative use case (1) a decision table of input conditions and output actions, (2) domain definitions for all variables, and (3) the relative frequency of each use case, compared to all other use cases in a system.

---

The Test Repository Manager 9 may provide utility functions necessary to manage a large collection of test models, simulation runs, and test runs. For example, the Test Repository Manager 9 may provide test asset management to create, update, and analyze information about test runs and the system under test. Furthermore, Test Run Inputs 29 can be generated, saved, and rerun, if so desired and programmed. According to one embodiment, the Test Repository Manager 9 may generate Test Repository Reports 35, for example, comparing multiple test runs on same Test Run Inputs 29, displaying repository statistics, audit trails, test documentation, etc. The repository storage may be implemented in a relational database management system. Test Results may be exported to a software reliability modeling tool, such as CASRE, for reliability analysis.

The Simulator 10 uses discrete-event digital simulation logic to produce Test Run Input files 29. These files contain a stream of input transactions to be applied to the system under test (SUT) and contain commands that control airlink emulation during a test run. The Simulator 10 schedules the time when each input and command is to be applied. According to one embodiment, the Simulator 10 may provide the following capabilities:

---

The ability to define, save, clone, and edit all of the parameters for a simulation.
Automatic generation of an input load.
Repeatable pseudo-random generation of event loads.
Tester specified total number of events.
Tester specified test duration.
Tester specified load profile.
Tester specified event profile.
Tester specified cell conditions.
Tester specified terrain/traffic model.

---

The Test Controller 11 performs the coordination necessary for the Test Agents 14 to apply the test run. The Test Controller 11 reads the Test Run Inputs 29 generated by the Simulator 10. According to one embodiment, the Test Controller 11 may provide the following capabilities:

---

Automated set up of the system under test.
Activation of test agents in virtual user device array.
Distribution of the simulated events to each test agent.
Collection of Test Agent 14 status for the test run log.
Automated shut down of the system under test.

---

A Test Agent 14 is a program that connects to a software or hardware interface of the system under test and applies generated test inputs. A test run will typically require many executable instances of the Test Agent 14, as suggested by the ellipses 1 . . . . n, 1 . . . m, p . . . q. A Test Agent 14 can interface with either (a) MUD clients 16 and Virtual Mobile User Devices 15 or with (b) an actual MUD 21 and MUD Client software 16 in combination with a MUD Controller 22. Each Test Agent 14 provides a level of indirection necessary to maintain flexibility. All Test Agents 14 will present the same software interface to other components, encapsulating the specifics of a particular device within the Test Agent 14. This allows existing components to drive new Test Agents 14 for new devices without changes to the existing drivers. Test Agents 14 may run as separate processes, providing the ability to simulate multiple end-users, and support network load and stress testing. Each Test Agent 14 may accept Test Agent Inputs 30 from the Test Controller 11. Test Agents 14 may then translate generic (or non-generic) application inputs into the actual system calls necessary to generate the physical test inputs. Moreover, Test Agents 14 may translate the response of a MUD 21 or Virtual MUD 15 into generic (or non-generic responses).

Test Agents 14 catch exceptions thrown by the virtual user device platform. Each MUD 21 and Virtual MUD 15 can indicate a hardware failure, transient problem (e.g., loss of signal), or other software error in many ways. These exceptions must be handled to prevent shut down and provide important test evaluation information. To maintain a uniform Test Agent 14 interface, each Test Agent 14 must encapsulate exception-handling logic for the interface it drives. Test Agents may also monitor actual response time per event and send test log data back to the Test Controller 11. A library of Test Agents 14 for supported MUDs 21 may be provided.

A Virtual Mobile User Device 15 is a software-only emulation of a MUD 21, which supports a MUD Client Under Test 16, which are both controlled through a Test Agent 14. The number of Virtual MUDs 15 is limited only by the storage capacity of the WTS Test Console Server 5. A typical application would use several thousand Virtual MUDs 15. The Virtual MUDs 15 provide the ability to generate and control overall network load without the cost and configuration management burden of a comparable number of actual physical MUDs 21 and MUD Controller 22 units in the MUD Array 24.

Figure 3:
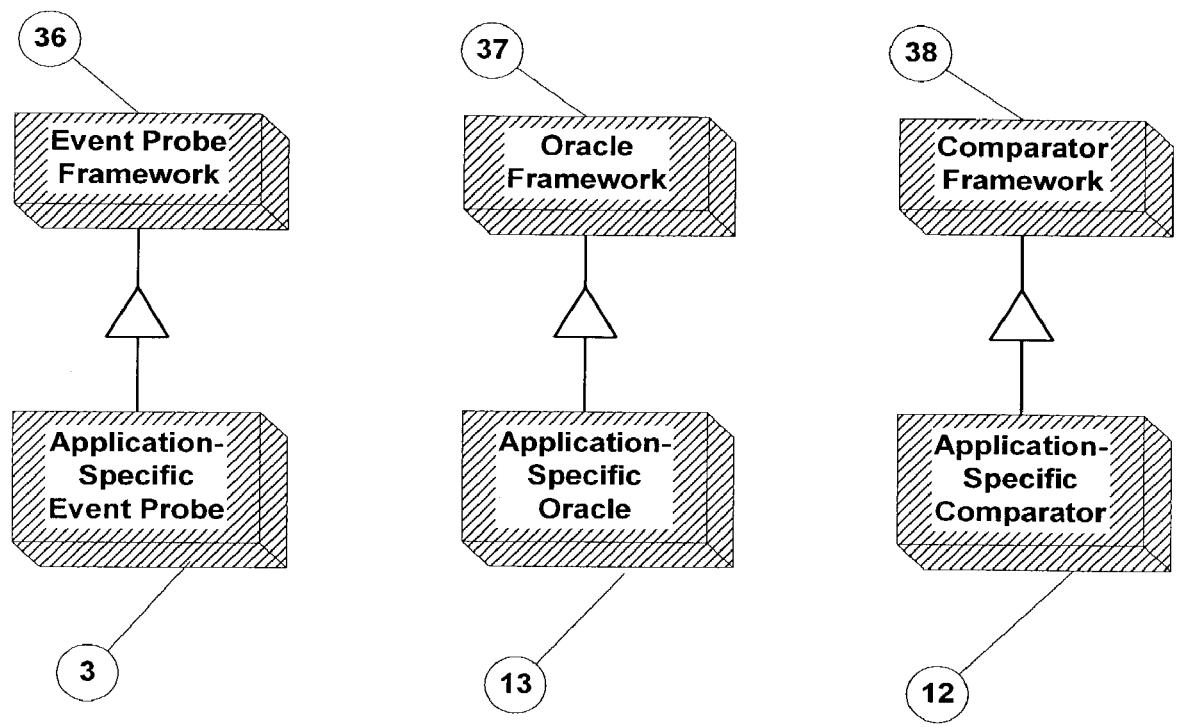
FIG. 3 shows exemplary software frameworks for the wireless testing system.

End-to-end testing of a distributed system requires control and monitoring of remote Application Servers 6. WTS therefore provides the Event Probe Framework 36, an object-oriented software framework, to allow its users to program their own Application-Specific Event Probe 3 which is compatible with WTS. This framework supports two kinds of interfaces: (1) Logical State Invariant Functions (LSIF). LSIFs report on an abstracted state of the system under test to the comparator. (2) Server Event Probe. The sequence in which the input stream is presented to system interfaces is not guaranteed to be the same as the sequence that arrives at the server(s). The event serialization log provides the input stream as processed by the server side of the SUT. This log supports event balancing, response time analysis, and evaluation of sequential processing. The server-serialized configuration solves the problem of non-determinism introduced upstream of the server. It may also be possible to use the client side input stream to produce expected results. FIG. 3 shows the relationship of the WTS Event Probe Framework 36 and a typical Application-Specific Event Probe 3.

High volume, profile-based testing is not possible without the ability to generate expected results for a test run input file. Manual development of expected results and manual review of Actual Results 32 typically cannot exceed a few test cases per hour, preventing effective high volume testing. An Oracle is a trusted source of expected results for a test case. For example, certain calculations done by the system under test could be programmed or stored in a separate software program (the Oracle) and independently verified. The appropriate computations and data representations for an Oracle are typically application-specific. WTS therefore provides the Oracle Framework 36, an object-oriented software framework, to allow its users to program their own Application-Specific Oracle 13 which is compatible with WTS. Entering the generated Test Run Inputs 29 in this Application-Specific Oracle 13 would then provide a trusted source of expected results for the generated test inputs. FIG. 3 shows the relationship of the WTS Oracle Framework 37 and a typical Application-Specific Oracle 13.

The Test Run Expected Results 33 must be compared to the Test Run Actual Results 32 to evaluate the test run and the performance and reliability of the system under test. The appropriate items to be compared, the comparison algorithm, and the test pass criteria are typically application-specific. WTS therefore provides an object-oriented software framework to allow its users to program their own Application-Specific Comparator 12 which is compatible with WTS. This comparator compares actual and expected results for each test case. If the results are different, the test did not pass. If the results are the same, the test passes. The Application-Specific Comparator 12 may produce the Test Run Results 34 in human-readable form and for storage by the Test Repository Manager 9. FIG. 3 shows the relationship of the WTS Comparator Framework 38 and a typical Application-Specific Comparator 13.

III. Exemplary WTS Hardware Architecture

FIG. 1 shows, in general, the WTS hardware architecture. In this embodiment, the software system supports the necessary user interface, modeling, and test control functions. The system may also support a remote monitoring link, which controls the number of virtual users that can be simulated and exercised during a test run.

The Test Console Server 5 may be an off-the-shelf general purpose computer system. The system may preferably be network addressable, so test engineers may login to the WTS Test Console Server 5 and use WTS software from any suitable desktop computer connected to the network.

The Mobile User Device (MUD) Array 24 consists of an arbitrary number of MUD units. According to one embodiment, each unit is a MUD Controller 22 and a physical MUD 21 (e.g., Compaq 3600 series PDA, Palm Pilot, Blackberry, Nokia SMS-based WAP phone, Sprint CDMA cell phone, Novatel CDPD device, etc.) which is modified to be software controlled via the MUD 21 Application Programmer Interface, provided with and resident on the MUD. This allows the MUD 21 transceiver interface to accept test inputs representing multiple users, achieving higher test utilization of each device. In this embodiment, a MUD Array 24 may have 3, 6, or 9 units, as ordered by a customer. Racks may be daisy-chained and two racks will emulate 18 simultaneous users, three racks 27 users, etc. As many MUDs as desired can be emulated, depending on the application. The MUD Array 24 is complemented by an arbitrary number of Virtual MUDs 15 to achieve very high traffic loads. The RF signal for each MUD in the MUD Array is carried on a coaxial cable 25 to the Signal Conditioning and Monitoring Equipment 23 and the Base Station Emulators 1.

Typical embodiments of WTS will use several commercial-off-the-shelf hardware and software components to achieve realistic, end-to-end mobile application testing. Base Station Emulator 1: Each off-the-shelf device conditions an RF signal and related protocol elements, under control of parameters generated by the Simulator 10. Signal Conditioning and Monitoring Unit 23: this off-the-shelf device provides the ability to emulate airlink variation and failure modes, under control of parameters generated by the Simulator 10. Router 2: this off-the-shelf device provides a TCP/IP interface to the Internet, while isolating the WTS local area network. Test Console Server 5: this off-the-shelf general purpose computer system supports many of the WTS software components. Disk Storage Array 17: this off-the-shelf mass storage system provides storage and work space for logs, databases, and other files used by the software components. Test Engineer's Workstation 18: this off-the-shelf general purpose computer system provides a human-computer interface for the Test Engineer using the system. LAN Cable 20: off-the-shelf category 5 twisted pair cable. RF Coax Cable 25: off-the-shelf RG-6 coaxial cable. Ethernet Hub 19: this off-the-shelf device supports an Ethernet local area network which provides communication among the WTS components.

IV. Typical Components of the System Under Test.

WTS may support testing of many combinations of MUDs 21, wireless and wired transmission and network equipment, and Application Servers 6. The present embodiment presents generic representations of these components, including: (1) Application Servers 6, which represent the network-accessible hardware/software systems that provide the server capabilities of the system under test, (2) MUDs 21, which represent the portable information technology devices supporting wireless communication, for example cell phones and personal digital assistants that provide the mobile client platform for the system under test, and (3) MUD Clients Under Test 16, which represent the application software programs that run on a MUD 21 providing client-side capabilities of the system under test.

The WAN channel 4, represents the multitude of wired and wireless channels that can support transmission between WTS and an Application Server. Within the WTS equipment plant, this may be off-the-shelf category 5 twisted pair cable.

V. Exemplary Testing With WTS

Referring back to FIG. 1, the following discussion provides additional insight into using WTS during testing.

1. Model the System Under Test

The user may represent the required behavior of the system under test with the Application Model Builder 8 using notation for state machines, sequence diagrams, decision tables, and data structures. The model should include a definition of user inputs, the relationship among user inputs, the interfaces accepting these events, and the response requirements. The modeling tool will assist the WTS user in developing a quantitative profile of these events.

2. Develop Application-Specific Components

The user may optionally develop an Application-Specific Oracle 13 (e.g., to generate expected results) using the Oracle Framework 37, an Application-Specific Event Probe 3 (extracts server side states and events) using the Event Probe Framework 37, or an Application-Specific Comparator 12 (determines pass/no-pass for each test case) using the WTS Comparator 38. Each framework provides all the necessary interfaces to other WTS components and common services.

3. Design the Test Run

After deciding on the goals and general approach for a test run, the user specifies the appropriate WTS simulation parameters and SUT configuration. Application Parameters 28 control the event profile, load profile, the number and kind of end-users to simulate, and time granularity.

4. Run the Simulator

Running the Simulator 10 generates a Test Run Input file 29 according to the Application Parameters 28. The Test Run Input file 29 is sent to the Test Controller 11 and/or the Application Specific Oracle 13.

5. Enable/Disable the Server Event Probe

Configure and setup the Application-Specific Server Event Probe 3 as necessary.

6. Execute the Test Run

The Test Console 7 generates Test Engineer Commands 26 based on user input. Test Engineer Commands 26 starts and control a test run. A test run may be executed in real-time or fast-forward mode. The Test Controller 11 may automatically start the Test Agents 14 necessary for the test run. The Test Agents 14 then automatically reformat and submit the Test Agent Inputs 30 to each MUD Client Under Test 16, at scheduled time during the test run. This will result in Application Data Transmission 31 between the MUD Clients Under Test 16 and the Application Servers 6.

The Test Controller 11 will also send commands to the Base Station Emulators 1 and the Signal Conditioning and Monitoring Unit 23 to emulate variation in airlink and network capacity at scheduled times during the test run. When the Test Controller 11 has processed the entire Test Run Input file 29, the Test Agents 14 are automatically shut down.

7. Run the Application-Specific Oracle 13 and Comparator

The Application-Specific Oracle 13 produces the expected results for a specific test run. The Application-Specific Comparator automatically compares Test Run Actual Results 32 to Test Run Expected Results 33. If the actual and expected are the same, the test run passes. If they are not, the test run does not pass. The Application-Specific Comparator 12 outputs the Test Run Results 29.

8. Run the Reliability Assessment

Test Repository Reports 35 showing failure data analyzed with industry-accepted system reliability models may be produced. WTS users will be given unambiguous quantitative feedback about the estimated reliability of the system under test.

VI. Conclusion

The present embodiments provide a next-generation testing system that can be used to verify mobility-related features, verify mobility-critical technology, verify system performance with realistic number of users and input rate, provide a realistic environment complete with end-users interacting with a network that may span over large geographic areas, and more. For example, designers may use the teachings disclosed herein to identify and correct defects resulting in load degradation, reduced system availability, dropped calls, missing/omitted capability, inadequate response, incorrect output response, and so on.

In view of the wide variety of embodiments to which the principles of the present embodiments can be applied, it should be understood that the illustrated embodiments, including the WTS, are exemplary only, and should not be taken as limiting the scope of the present invention. For example, more or fewer elements may be used in the figures, as indicated by the ellipses.

We claim:

1. A method for evaluating a wireless system comprising the steps of:

modeling application user behavior for a system under test using an application model builder that is independent from the system under test, wherein modeling application user behavior comprises:

creating an application-specific event profile that defines the relative probability of events that are expected to produce a response from the system under test;

creating an event model that defines inputs and outputs of each of the events, wherein the event model specifies a domain of outputs for a particular input condition; and defining allowed event sequences;

providing at least one of the application-specific event profile the event model, and the allowed event sequences to a simulator to generate test run inputs;

using an application-specific trusted source derived from a trusted source framework to generate expected test results from the test run inputs;

executing an end-to-end test run of the system under test using the test run inputs and a plurality of test agents controlling wireless mobile user devices under a test controller, wherein the end-to-end test run generates actual test results; and using an application-specific comparator derived from a comparator framework to compare the actual test results to the expected test results to determine a test verdict.

2. The method as in claim 1, wherein a first portion of the plurality of test agents have a first type of application user behavior, and wherein a second portion of the plurality of test agents have a second type of application user behavior.

3. The method as in claim 1, further comprising conducting a reliability assessment of the test results.

4. The method as in claim 1, wherein the application-specific event profile is further based on a time varying load profile.

5. The method as in claim 1, wherein modeling the application user behavior is further based on application user movement through a coverage area.

6. The method as in claim 1, wherein modeling the application user behavior is further based on radio frequency signal propagation properties in a coverage area.

7. The method as in claim 1, wherein the end-to-end test run further comprises a test output that ends at a modeled application user.

8. The method as in claim 1, wherein the end-to-end test run further comprises a test output that ends at an application server within the system under test.

9. The method as in claim 1, further comprising dividing the test run inputs among at least two test agents and wherein, during the end-to-end test run, the at least two test agents to apply the test run inputs to the system under test at times scheduled by the simulator.

* * * * *